No. 853,243. PATENTED MAY 14, 1907.
J. HOLLEY.
BRACE.
APPLICATION FILED JULY 7, 1906.
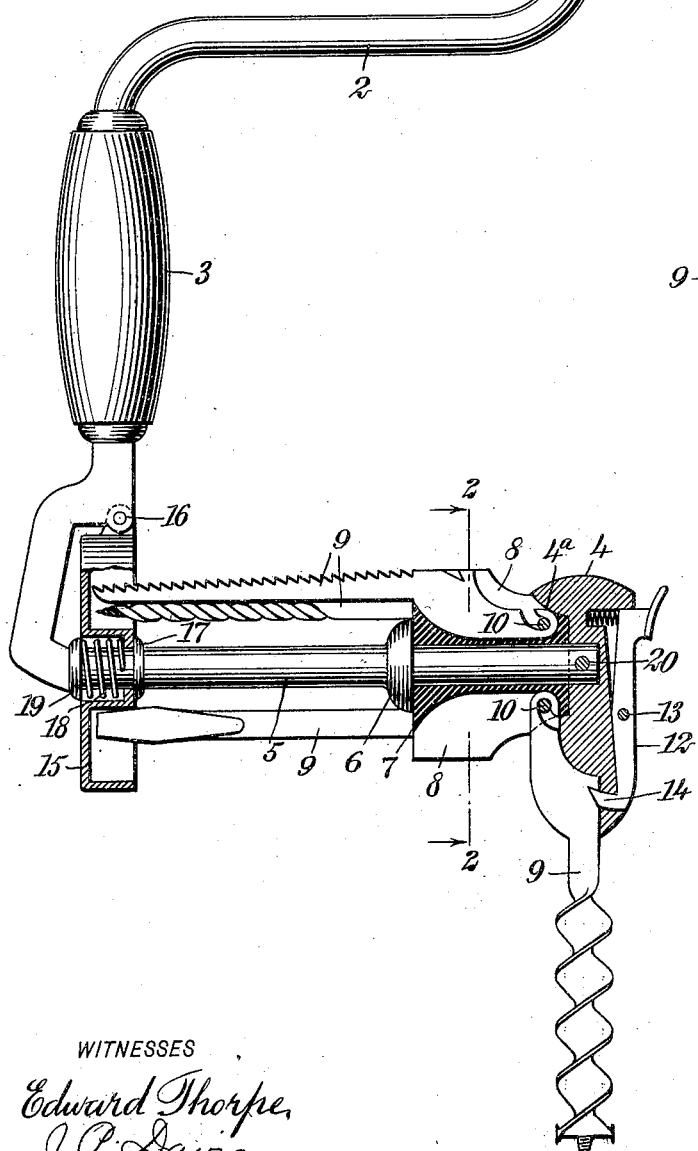
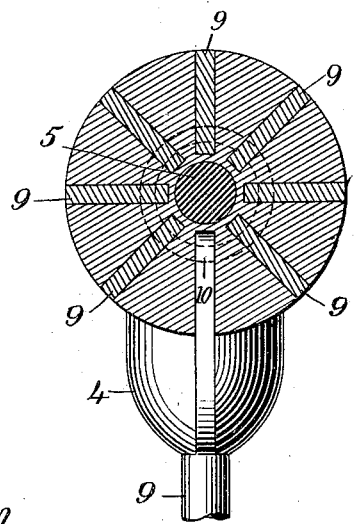
WITNESSES
Edward Thorpe,
J. P. Davis
INVENTOR
James Holley
BY Munn & Co
ATTORNEYS

UNITED STATES PATENT OFFICE.

JAMES HOLLEY, OF WEST PALMBEACH, FLORIDA, ASSIGNOR TO AMERICAN CYLINDER BRACE AND TOOL MANUFACTURING COMPANY, OF WEST PALMBEACH, FLORIDA.

BRACE.

No. 853,243.     Specification of Letters Patent.     Patented May 14, 1907.

Application filed July 7, 1906. Serial No. 325,092.

*To all whom it may concern:*

Be it known that I, JAMES HOLLEY, a citizen of the United States, and a resident of West Palmbeach, in the county of Dade and State of Florida, have invented a new and Improved Brace, of which the following is a full, clear, and exact description.

This invention relates to a brace having a plurality of tools attached thereto, and constitutes an improvement upon the device illustrated and claimed in my Patent Number 745,059, granted November 24, 1903, and the object is to simplify and improve the device shown in said patent.

Reference is to be had to the accompanying drawings which form part of this specification, in which drawings like characters of reference indicate corresponding parts throughout the views, and in which Figure 1 is a side elevation of my improved brace showing portions thereof in section; and Fig. 2 is a cross section on the line 2—2 of Fig. 1 taken in the direction indicated by the arrows.

According to the form of the invention shown, it comprises a breast or shoulder brace 1, secured to the end of a crank, having crank arms 2 and 5 and a handle 3 for turning the same. At the end of the crank arm 5 is rigidly secured a head 4 having an annular recess 4ª to receive the tool carrier, and a longitudinal groove to receive the tool. Within the longitudinal groove on the outer surface of the head is a catch 12 pivoted on a pin 13 and having a prong 14 adapted to engage with the tool substantially in the manner shown in my previous patent. On the crank arm 5 is rotatably mounted a tool carrier 7 having a plurality of tools 9 secured thereto by means of a ring 10 fitted into curved slots formed in one end of the tools, as shown in Fig. 1, and the said tools are adapted to lie in radial grooves in the surface of the carrier or holder when the said tools are in the folded or inactive position. The tool holder is secured against longitudinal movement by means of a collar 6 on the arm 5, and is prevented from rotating at the time a tool is being used, by the shank of the tool which fits into a groove in the head 4. On the crank arm 5 adjacent the handle 3 is provided a guard 15 pivotally connected to the crank by a pin 16, and normally held against a collar 17 by the action of a spring 18 abutting against a second collar 19.

The operation and action of my new and improved brace is substantially the same as that set forth in my previous patent above referred to, but by mounting the tool carrier and guard upon the crank arm rather than by providing a separate shaft therefor, the device is rendered very much simpler and less costly. In case it is desired to remove the tool carrier, it is merely necessary to withdraw the pin 20 which secures the head on the end of the crank arm, and the tool carrier may then be readily and quickly removed.

Having thus described my invention, I claim as new and desire to secure by Letters Patent:

1. A brace comprising a crank having a crank arm, a head rigidly secured to the crank arm, a tool carrier pivotally mounted on the crank arm, and a plurality of tools adjustably mounted on the carrier and capable of independent movement into engagement with said head.

2. A brace comprising a crank arm and a handle, a head rigidly secured to the crank arm, a tool carrier mounted to rotate on the crank arm, a plurality of tools adjustably mounted on the carrier, and a guard mounted on the crank arm adjacent the handle and adapted to receive the ends of the tools when the same are not in use.

3. A brace comprising a crank arm and a handle, a head rigidly secured on the end of the crank arm, a tool carrier mounted to rotate on the crank arm, and a tool guard pivotally mounted on the crank arm adjacent the handle and adapted to receive the ends of the tools.

4. A brace comprising a crank arm, a handle, a head on the end of the crank arm, a tool carrier mounted to turn on the arm and having a plurality of tools pivotally connected thereto and movable independently into engagement with the head, and a catch on the head adapted to hold the tools in engagement therewith.

5. A brace comprising a crank arm, a head having a cavity or recess therein and secured on the end of the crank arm, a carrier rotatably mounted on the crank arm and having a portion projecting into said cavity, the carrier being formed with a number of longitudinal slots, a plurality of tools having their shanks pivoted in said slots, the head having a radial slot and with which any one of the tools of the carrier may register, whereby to permit the tools to be thrown outward into the said slot of the head, and a catch for removably holding the tools in said slot.

6. A brace comprising a head having a cavity or recess therein, a crank arm secured to said head at the center of said recess, a carrier mounted to rotate on the crank arm and having a portion thereof extending into the said cavity, the carrier being formed with a number of longitudinal slots, and a plurality of tools having their shanks pivoted in said slots, the head having a radial slot with which any one of the slots of the carrier may register whereby to permit the tool to be thrown outward into the said slot of the head.

7. A brace comprising a crank arm, a head carried thereby, a carrier mounted to turn on the arm, a plurality of tools adjustably mounted on the carrier and capable of being independently moved outward into engagement with the head, a guard pivotally connected to said brace and surrounding the crank arm and the ends of the tools, and a spring normally holding said guard in active position.

8. A brace comprising a crank arm, a head carried thereby, a carrier mounted to rotate on the crank arm and in engagement with the head, a plurality of tools pivoted on the carrier and capable of movement independently into said cavity in the head, and a catch pivoted on the head, each tool having a curved recess therein and the catch having a correspondingly hooked portion capable of entering said recesses for holding the tool in engagement with the head.

In testimony whereof I have signed my name to this specification in the presence of two subscribing witnesses.

JAMES HOLLEY.

Witnesses:
J. F. CARLILE,
H. P. BRANNING.